US012591592B2

(12) United States Patent
Ling

(10) Patent No.: US 12,591,592 B2
(45) Date of Patent: Mar. 31, 2026

(54) METHOD, ELECTRONIC DEVICE, AND COMPUTER PROGRAM PRODUCT FOR REPLICATING DATA

(71) Applicant: Dell Products L.P., Round Rock, TX (US)

(72) Inventor: Qing Hua Ling, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/929,913

(22) Filed: Oct. 29, 2024

(65) Prior Publication Data

US 2025/0335464 A1    Oct. 30, 2025

(30) Foreign Application Priority Data

Apr. 26, 2024    (CN) .......................... 202410516878.4

(51) Int. Cl.
*G06F 16/00*        (2019.01)
*G06F 16/27*        (2019.01)
(52) U.S. Cl.
CPC .................................... *G06F 16/27* (2019.01)
(58) Field of Classification Search
CPC ...................................................... G06F 16/27
See application file for complete search history.

(56) References Cited

U.S. PATENT DOCUMENTS

| | | | |
|---|---|---|---|
| 9,251,086 B2 | 2/2016 | Peterson et al. | |
| 9,268,811 B1 * | 2/2016 | Thakur | ............... G06F 16/2358 |
| 9,432,298 B1 | 8/2016 | Smith | |
| 10,467,102 B1 * | 11/2019 | Baruch | ............... G06F 16/2255 |
| 12,248,692 B1 * | 3/2025 | Chandrashekhara | ... G06F 3/064 |
| 2015/0378771 A1 * | 12/2015 | Tarasuk-Levin | .... G06F 9/45558 |
| | | | 718/1 |
| 2019/0243547 A1 * | 8/2019 | Duggal | ................. G06F 3/0619 |
| 2019/0243688 A1 * | 8/2019 | Karmarkar | ........... G06F 9/5083 |
| 2019/0243702 A1 * | 8/2019 | Shilane | .............. G06F 11/0709 |
| 2021/0021693 A1 * | 1/2021 | Ippatapu | .......... H04L 43/0888 |
| 2021/0034484 A1 * | 2/2021 | Meiri | .................... G06F 13/28 |
| 2021/0319408 A1 | 10/2021 | Jorasch et al. | |
| 2021/0400142 A1 | 12/2021 | Jorasch et al. | |

(Continued)

FOREIGN PATENT DOCUMENTS

| | | | | | |
|---|---|---|---|---|---|
| CN | 100418062 C | * | 9/2008 | ............. | E03B 7/006 |
| CN | 115454709 A | * | 12/2022 | ........... | G06F 11/108 |

*Primary Examiner* — Alexander Khong
(74) *Attorney, Agent, or Firm* — BainwoodHuang

(57)                ABSTRACT

Techniques to replicate data involve obtaining, based on a state bitmap of the data, a first identifier indicating a snapshot difference of the data and a second identifier indicating an allocation state of the data, where the first identifier indicates that data in which pages in the data needs to be replicated from a source node to a target node, and the second identifier indicates which pages in the data are compressed together as a single compression group. Such techniques further involve generating scatter-gather information for replicating the data based on an input output (IO) capability of the target node, the first identifier, and the second identifier. Such techniques further involve replicating the data corresponding to the scatter-gather information from the source node to the target node. Accordingly, data transmission overheads during data replication can be reduced, and IO performance can be improved.

20 Claims, 8 Drawing Sheets

300

302
Obtain, based on a state bitmap of data, a first identifier indicating a snapshot difference of the data and a second identifier indicating an allocation state of the data 304
Generate scatter-gather information for replicating the data based on an IO capability of a target node, the first identifier, and the second identifier 306
Replicate the data corresponding to the scatter-gather information from a source node to the target node

(56)         References Cited

U.S. PATENT DOCUMENTS

| | | | |
|---|---|---|---|
| 2022/0027311 A1* | 1/2022 | Hu | G06F 16/128 |
| 2023/0135954 A1* | 5/2023 | Sharma | G06F 11/0727 |
| 2024/0362124 A1* | 10/2024 | Sharma | G06F 16/258 |
| 2024/0362183 A1* | 10/2024 | Sharma | G06F 16/1744 |
| 2024/0364548 A1 | 10/2024 | Jorasch et al. | |

* cited by examiner

100

200

300

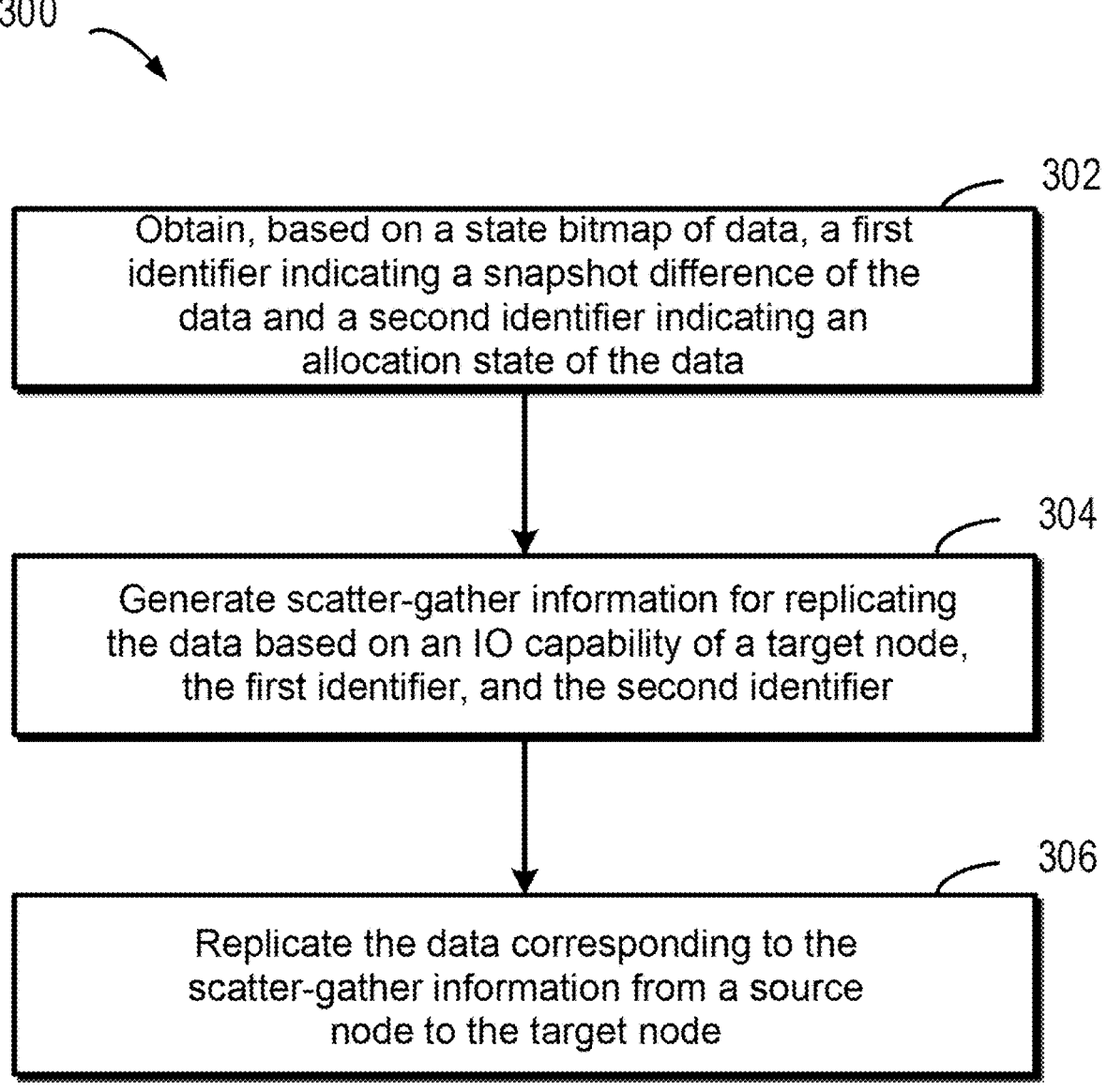

302

Obtain, based on a state bitmap of data, a first identifier indicating a snapshot difference of the data and a second identifier indicating an allocation state of the data

304

Generate scatter-gather information for replicating the data based on an IO capability of a target node, the first identifier, and the second identifier

306

Replicate the data corresponding to the scatter-gather information from a source node to the target node

Fig. 3

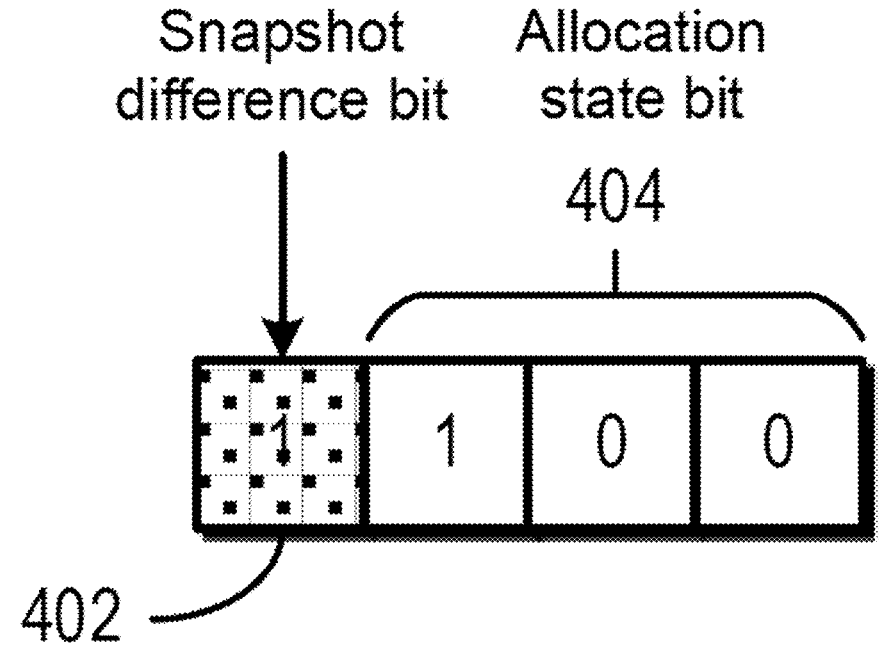
Fig. 4

900

METHOD, ELECTRONIC DEVICE, AND COMPUTER PROGRAM PRODUCT FOR REPLICATING DATA

CROSS-REFERENCE TO RELATED APPLICATION

This application claims priority to Chinese Patent Application No. CN202410516878.4, on file at the China National Intellectual Property Administration (CNIPA), having a filing date of Apr. 26, 2024, and having "METHOD, ELECTRONIC DEVICE AND COMPUTER PROGRAM PRODUCT FOR REPLICATING DATA" as a title, the contents and teachings of which are herein incorporated by reference in their entirety.

TECHNICAL FIELD

Embodiments of the present disclosure relate to the field of computers, and more specifically, to a method, an electronic device, and a computer program product for replicating data.

BACKGROUND

A storage array is a system composed of a plurality of disks that work together as a whole to improve capacity, performance, and reliability of data storage. The storage array achieves fast access to data by scattering and storing data on a plurality of hard drives. Performance of the storage array is limited by the slowest disk (for example, input output IO performance during data replication). In the storage array, data replication typically relates to copying data from one storage location to another, which may include data transmission crossing disks, arrays, or networks. The I/O performance is an important indicator of a capability of a computer system to handle data storage tasks, especially when it comes to transmission and storage operations for large amounts of data, such as data backup, mirroring, snapshots, and data replication in storage arrays.

SUMMARY OF THE INVENTION

Embodiments of the present disclosure provide a method, an electronic device, and a computer program product for replicating data.

According to a first aspect of the present disclosure, a method for replicating data is provided. The method includes obtaining, based on a state bitmap of the data, a first identifier indicating a snapshot difference of the data and a second identifier indicating an allocation state of the data, where the first identifier indicates that data in which pages in the data needs to be replicated from a source node to a target node, and the second identifier indicates which pages in the data are compressed together as a single compression group. The method further includes generating scatter-gather information for replicating the data based on an input output (IO) capability of the target node, the first identifier, and the second identifier. The method further includes replicating the data corresponding to the scatter-gather information from the soOurce node to the target node.

According to a second aspect of the present disclosure, an electronic device is further provided. The electronic device includes a processor and a memory coupled to the processor and having instructions stored therein, where the instructions, when executed by the processor, cause the device to perform actions. The actions include obtaining, based on a state bitmap of the data, a first identifier indicating a snapshot difference of the data and a second identifier indicating an allocation state of the data, where the first identifier indicates that data in which pages in the data needs to be replicated from a source node to a target node, and the second identifier indicates which pages in the data are compressed together as a single compression group. The actions further include generating scatter-gather information for replicating the data based on an input output IO capability of the target node, the first identifier, and the second identifier. The actions further include replicating the data corresponding to the scatter-gather information from the source node to the target node.

According to a third aspect of the present disclosure, a computer program product is provided. The computer program product is tangibly stored on a computer-readable medium and includes computer-executable instructions. The computer-executable instructions, when executed by a device, cause the device to perform a method. The method includes obtaining, based on a state bitmap of the data, a first identifier indicating a snapshot difference of the data and a second identifier indicating an allocation state of the data, where the first identifier indicates that data in which pages in the data needs to be replicated from a source node to a target node, and the second identifier indicates which pages in the data are compressed together as a single compression group. The method further includes generating scatter-gather information for replicating the data based on an IO capability of the target node, the first identifier, and the second identifier. The method further includes replicating the data corresponding to the scatter-gather information from the source node to the target node.

The Summary of the Invention part is provided to introduce the selection of concepts in a simplified form, which will be further described in the Detailed Description below. The Summary of the Invention part is neither intended to identify key features or essential features of the claimed subject matter, nor intended to limit the scope of the claimed subject matter.

BRIEF DESCRIPTION OF THE DRAWINGS

The above and other features, advantages, and aspects of embodiments of the present disclosure will become more apparent with reference to the drawings and the detailed descriptions below. In the drawings, identical or similar reference numerals indicate identical or similar elements, in which:

FIG. 3 schematically shows a flowchart of a method for replicating data according to an example implementation of the present disclosure;

FIG. 4 schematically shows a schematic diagram of a state bitmap according to an example implementation of the present disclosure;

In all of the drawings, identical or similar reference numerals indicate identical or similar elements.

DETAILED DESCRIPTION

Figure 1:
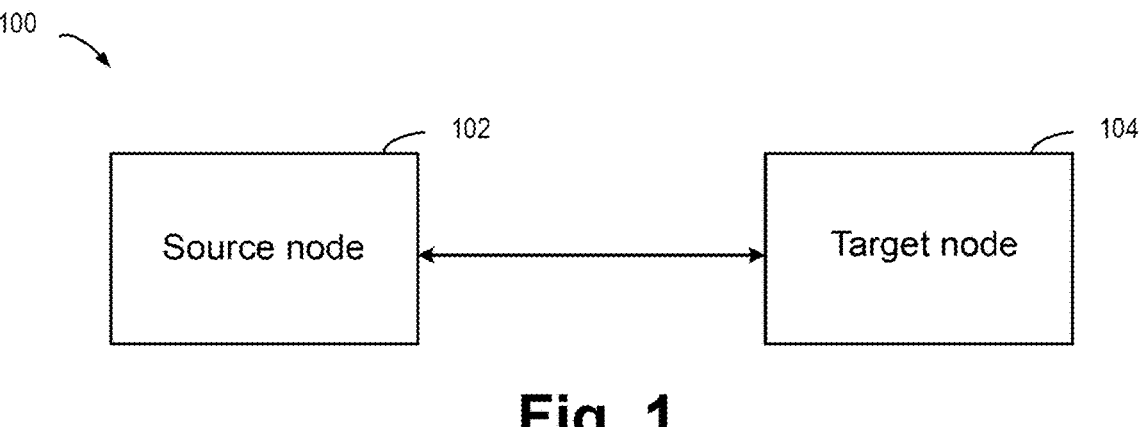
FIG. 1 schematically shows a block diagram of an example environment in which a method of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in further detail below with reference to the accompanying drawings. Although the accompanying drawings show some embodiments of the present disclosure, it should be understood that the present disclosure may be implemented in various forms, and should not be explained as being limited to embodiments stated herein. Rather, these embodiments are provided for understanding the present disclosure more thoroughly and completely. It should be understood that the accompanying drawings and embodiments of the present disclosure are for example purposes only, and are not intended to limit the scope of protection of the present disclosure.

In the descriptions of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

Additionally, all specific numerical valuesherein are examples, which are provided only to aid in understanding, and are not intended to limit the scope.

As discussed above, in a storage array, data replication typically relates to copying data from one storage location to another, which may include data transmission crossing disks. Therefore, optimizing I/O performance is critical for improving performance of an entire storage system. In the conventional technology, compressed data is directly read from a backend without the need for a decompression-recompression cycle. However, if partially reading is performed in a compression group, the decompression-recompression cycle cannot be avoided because part of compressed data is invalid for the compression group. During decompression, it is necessary to first decompress the entire compression group, then read some pages, and finally compress these pages together again. If there are too many such replication IOs, overall system performance will be affected.

In view of this, a method of the present disclosure provides a method for replicating data. A replication I/O offset or length is adjusted, so that IO alignment in a compression group is used to expand an allocation state bitmap, but partial reading of the compression group is avoided and a decompression-recompression cycle is avoided. In some embodiments, IO offset alignment based on a page size reduces data transmission overheads to the greatest extent possible. Embodiments of the present disclosure can optimize data transmission and improve the IO performance based on an IO capability of a target storage device.

FIG. 1 schematically shows a block diagram of an example environment 100 in which a method of the present disclosure may be implemented. As shown in FIG. 1, the example environment 100 may include a source node 102 and a target node 104. Here, the source node 102 may be understood as a local node, and data on the source node needs to be replicated to the target node 104. The target node 104 may be understood as a remote node that needs to receive data from the source node 102 and store a copy on the target node. Both the source node 102 and the target node 104 are storage devices. For example, the source node 102 is a hard disk drive (HDD), a solid-state drive (SSD), a hybrid hard disk (HHDD), a network attached storage (NAS), a storage array, a distributed storage system, or the like. For an easier understanding of the present disclosure, a workflow of a storage device of the present disclosure will be described with reference to FIG. 2.

Figure 2:
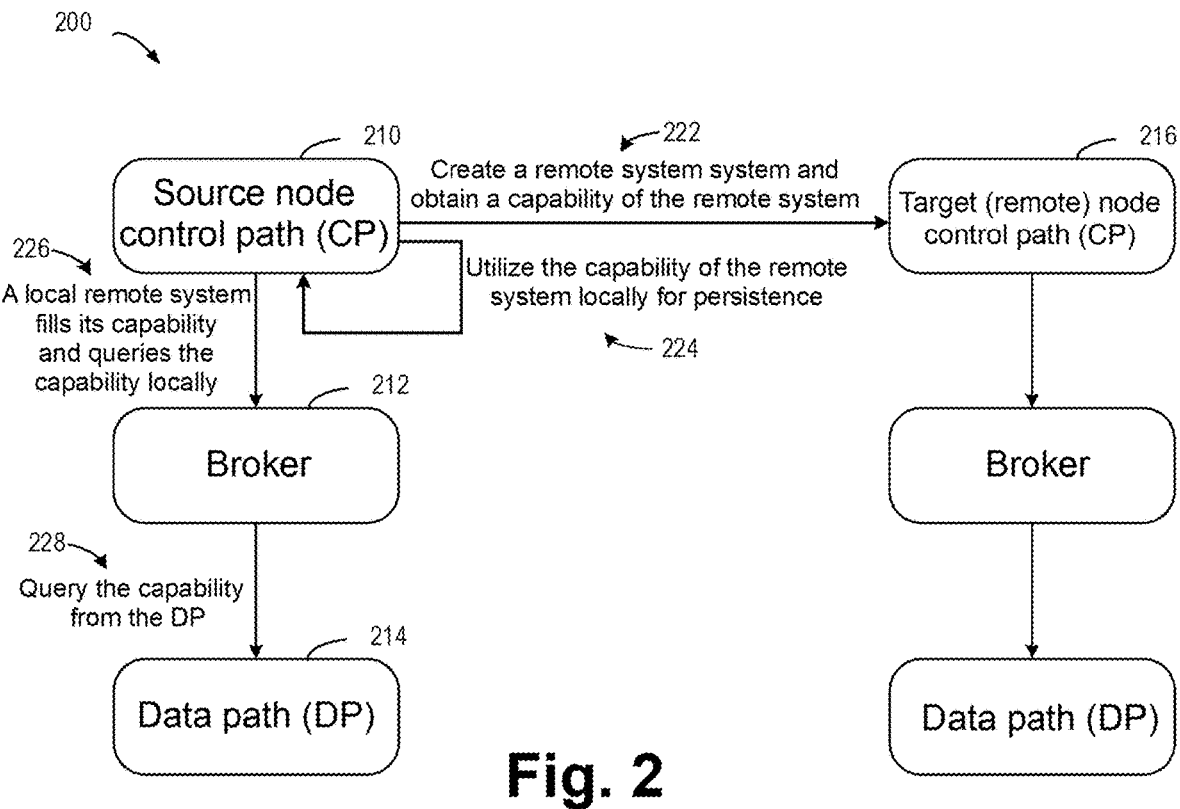
FIG. 2 schematically shows a schematic diagram of a workflow of a source node and a target node according to an example implementation of the present disclosure.

FIG. 2 schematically shows a schematic diagram of a workflow 200 of a source node and a target node according to an example implementation of the present disclosure. In FIG. 2, a target node 216 is also referred to as a remote node 216, and data transmission between a source node and the remote node crosses devices. A control path (CP) indicates control logic required to register to software. A broker is used to manage storage and retrieval of data, optimize performance, or provide additional data management functions, including but not limited to forwarding messages, providing security, handling authorization and authentication, and providing interfaces between different systems or services. A data path (DP) may be represented as a data management module of a storage device.

At step 222, the source node 210 creates a session to the remote node 216 and a remote system object created locally, and requests for an IO capability of the remote node 216. At 224, a socket is created between the source node 210 and the remote node 216. The remote system object of the source node 210 in the local may obtain the IO capability of the remote node 216. The IO capability may include a page size, compression information, a maximum IO length, and the like. The source node 210 stores IO capability information in the remote system object in the local. The source node 210 may persist local IO transmission based on an IO capability of a remote system.

At 228, the source node 210 queries about its own IO capability from a DP 214. At 226, the source node 210 fills in the IO capability of the source node 210 locally. The source node 210 may use its own IO capability and the capability of the remote system to make a state bitmap. Specifically, the CP will fill attributes of a local system with a value of the CP during system startup through a broker 212 from the DP 214. When the remote system 216 is configured, the remote system 216 will query about a function of the remote node 216 and persist the function to the remote system object. Next, in a replication setup process, the remote system 216 will match capabilities of the source node 210 and the remote node 216 to determine which kind of IO alignment is required, and then transfer a corresponding IO alignment parameter to a backend data replicator object.

In some embodiments, when the page size is 4 KB, an IO offset needs to be aligned to 8 KB only when a page size of the source node 210 is 4 KB and a page size of the remote node 216 is 8 KB. Otherwise, the IO offset does not need to be aligned to 8 KB because an offset in 8 KB is always aligned to 4 KB. In compression, some reading issues only The allocation state indicates compression group information. For example, a page size of 4 KB is used as an example. On an array with a page size of 4 KB, a compression size is fixed to be 4 KB, and each page will be compressed separately. For another example, in order to achieve a higher compression ratio, a variable compression length of 4 KB to 32 KB is introduced, with up to 8 pages compressed together as a single compression group. If some pages are read from the compression group, the entire compression group needs to be decompressed, which will increase data transmission overheads.

The state bitmap 400 proposed in the present disclosure combines the snapshot difference bit 402 and the allocation state bit 404. As shown in Table 1, 3 bits of an allocation state identifier may indicate whether a page is the start of the compression group, in the compression group, the end of the compression group, or not in the compression group.

TABLE 1

| Allocation state identifier | | |
|---|---|---|
| Bit | Allocation data mode | Comments |
| 100 | ALLOC_STATE_DATA_CG_START | Start of the compression group |
| 101 | ALLOC_STATE_DATA_CG | In the compression group |
| 110 | ALLOC_STATE_DATA_CG_END | End of the compression group |
| 111 | ALLOC_STATE_DATA_CG_NO | This page is not in the compression group | occur on a source node with a variable compression size. If the source uses a fixed compression size of 4 KB, an entire compression unit will be covered each time of reading IO.

FIG. 3 schematically shows a flowchart of a method 300 for replicating data according to an example implementation of the present disclosure. At 302, obtain, based on a state bitmap of data, a first identifier indicates a snapshot difference of the data, and a second identifier indicates an allocation state of the data. The first identifier indicates that data in which pages in the data needs to be replicated from the source node to the target node. The second identifier indicates which pages in the data are compressed together as a single compression group.

As a reference, referring to FIG. 4 to understand the state bitmap, the first identifier, and the second identifier. FIG. 4 schematically shows a schematic diagram of a state bitmap 400 according to an example implementation of the present disclosure. In the embodiment shown in FIG. 4, a structure of the state bitmap 400 is shown. The highest bit 402 of the state bitmap 400 is a bit indicating a snapshot difference (also known as the first identifier). Three bits 404 to the right of the highest bit 402 in the state bitmap 400 are bits indicating an allocation state (also known as the second identifier).

Tracking incremental data of the snapshot difference is used to identify and replicate data that has changed since the last snapshot. This method can optimize the data replication process, especially when crossing node or crossing storage array replication is involved. This can significantly improve efficiency and reduce a required network bandwidth. At 402, 1 indicates that a corresponding page (such as 4-bit data) has changed, and 0 indicates that a corresponding page (such as 4-bit data) has not changed. Therefore, the page corresponding to 1 needs to be replicated to a target node, while the page corresponding to 0 does not need to be replicated to the target node.

A snapshot difference identifier may be combined with the allocation state identifier to form the state bitmap 400. The state bitmap 400 is 1100, indicating that the page has changed and the data mode is the start of the compression group. If the state bitmap 400 is a state bitmap 0001, it indicates that the page has not been changed and the data mode is an all-zero data mode. The compression group information may be stored in a virtual logical block (VLB) node of a storage device, and each leaf node with 4 KB pages is scanned when snapshot differences are enumerated. Therefore, a VLB node may be obtained through a leaf node during compression group information. After obtaining the snapshot difference identifier, the compression group information, and the allocation state identifier, each 4 KB page stores them together in 4 bits, and finally an entire state bitmap is returned when all pages are iterated.

Generally, compressed pages will have the same write commit and logical continuity, so the snapshot differences in replicated incremental copies will theoretically cover the entire compression group. However, some backgroup processes also merge some consecutive pages into one compression group, and a current maximum replication IO size is still 64 KB. This may split a snapshot increment into a plurality of IO requests in 64 KB. Therefore, some IO requests will apparently cross compression groups. In this case, these IO requests will be processed by using an additional decompression-recompression cycle. If there are too many such replication IOs, overall system performance may be affected. Therefore, based on the state bitmap of the present disclosure, compressed data may be directly read from the backend without the need for the decompression-recompression cycle. The decompression-recompression cycle is avoided.

Now returning to FIG. 3, at 304, generate scatter-gather information for replicating the data based on an input output IO capability of the target node, the first identifier, and the second identifier. At 306, replicate the data corresponding to the scatter-gather information from the source node to the target node. For example, a scatter-gather list (SGL) is generated. The SGL is a data structure used to efficiently manage memory access operations in computer science and storage systems. The SGL is mainly used to handle operations that require reading from a plurality of non-continuous memory blocks (scattered) or writing to continuous memories (gathered). In order to better understand how to generate the SGL, the following will be discussed in conjunction with FIG. 5.

Figure 5:
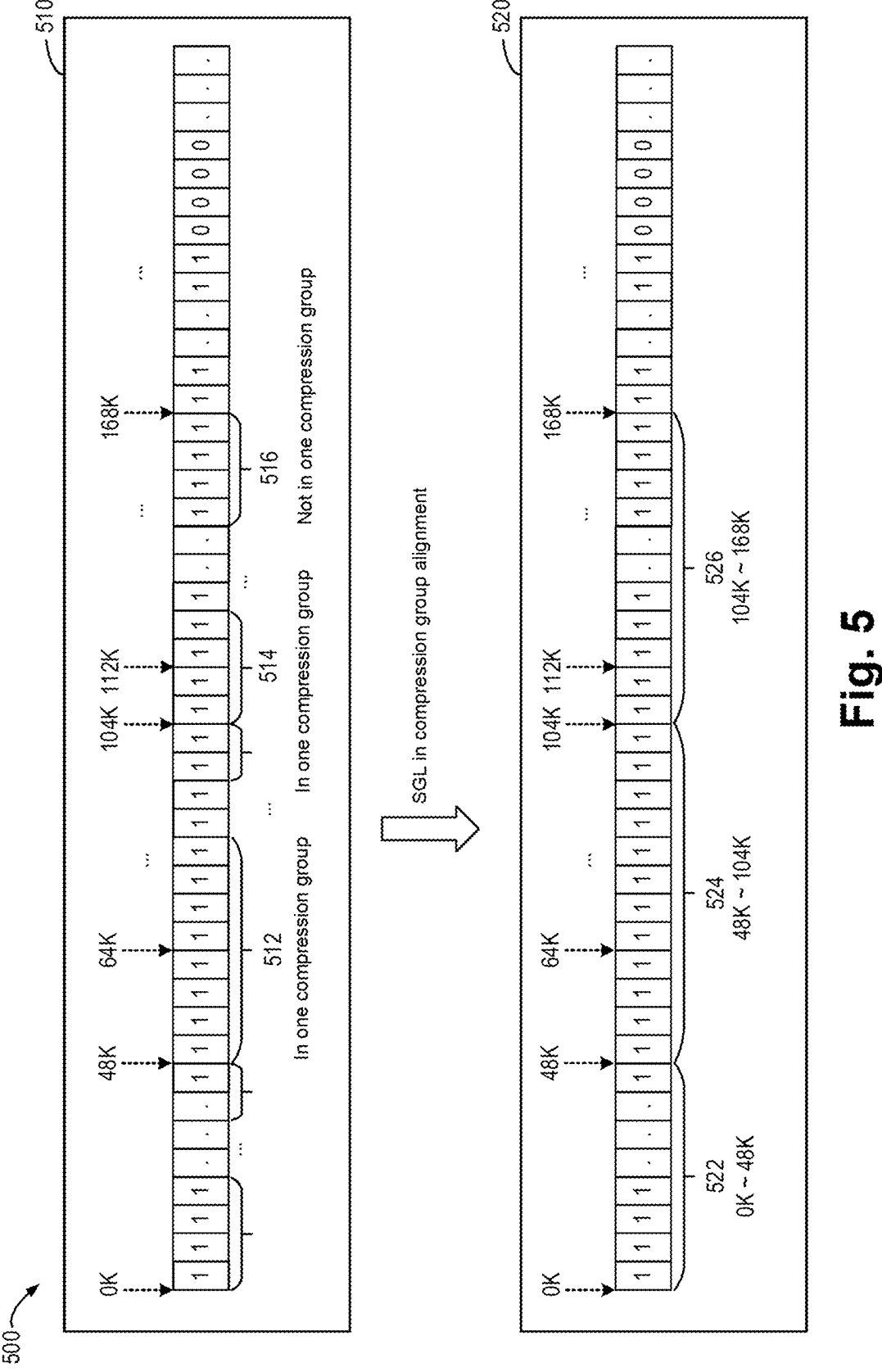
FIG. 5 schematically shows a schematic diagram of a process of alignment based on a compression group according to an example implementation the present disclosure.

FIG. 5 schematically shows a schematic diagram of a process 500 of alignment based on a compression group according to an example implementation the present disclosure. Block 510 shows a snapshot difference bitmap of data. In block 510, 1 indicates that a corresponding page has changed. A logical address of the page increases from the leftmost 0K (KB), with each page occupying 4K. In the figure, 8 pages included in parentheses 512 are in one compression group. 4 pages included in parentheses 514 are in one compression group. 4 pages included in parentheses 516 are not in one compression. If a conventional solution is followed, data located at location 64K (referred to as a breakpoint) will be in two different SGLs (at a maximum IO length of 64K), resulting in the decompression-recompression cycle described above.

However, if the solution of the present disclosure is followed, an SGL 522 may be set between 0K and 48K. Another SGL 524 is set between 48K and 104K. Similarly, an SGL 526 may be set between 104K and 168K. In this way, alignment of the compression group is achieved, which will generate replication IOs from 0 to 48 KB (at the end of the last compression group) and start new replication IOs from 48 KB. The next breakpoint is also at 48 KB+64 KB=112 KB in another compression group, so the compression group needs to be aligned with the last compression group, and an SGL needs to be completed at 104K. In this way, data in one compression group may be transmitted in one time of transmission, avoiding the decompression-recompression cycle.

Figure 6:
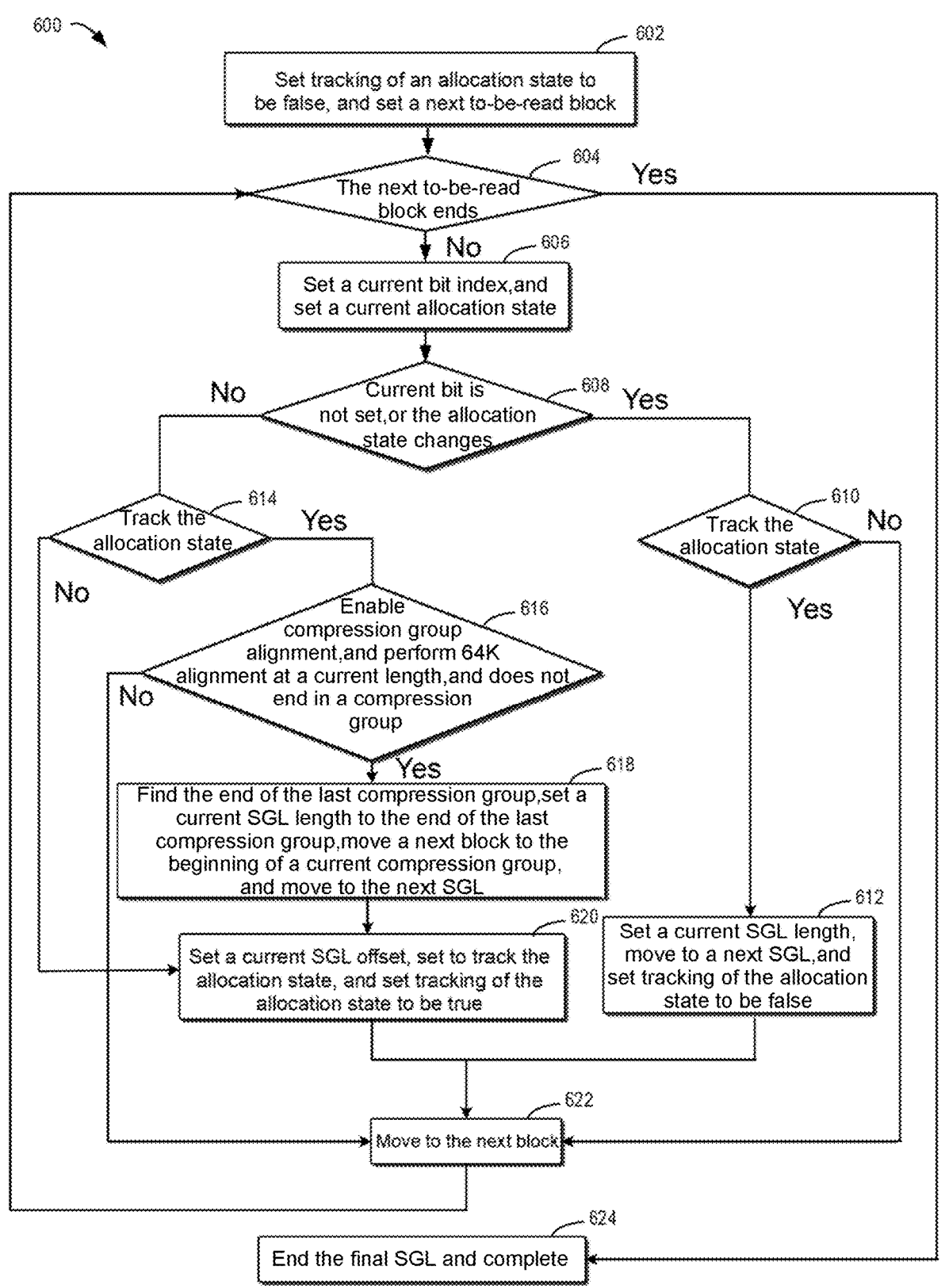
FIG. 6 schematically shows a schematic diagram of a process of generating a scatter-gather list (SGL) of alignment based on a compression group according to an example implementation the present disclosure.

In order to have a more complete understanding of how to generate the SGL, the present disclosure proposes a process of generating an SGL of alignment based on a compression group, as shown in FIG. 6. FIG. 6 schematically shows a schematic diagram of a process 600 of generating an SGL of alignment based on a compression group according to an example implementation the present disclosure. Service logic for replicating IOs to generate an SGL is shown in FIG. 6. During the SGL generation process, the alignment of the compression group will be checked, and a maximum IO length of 64 KB will be discussed as an example.

At 602, as a starting point, prepare to generate the SGL, set (for example, determine) an allocation state to be false at this point, and set a to-be-read next data block. At 604, determine whether the to-be-read next data block ends. If the to-be-read next data block does not end, the process 600 continues to progress to 606. If the to-be-read next data block ends, the process 600 continues to progress to 624. At 624, end a final SGL and complete the entire SGL generation process.

After the to-be-read next data block is read (the next data block becomes a current data block), at 606, set a current bit index and set a current allocation state. At 608, if a current bit is not set or a condition for changing the allocation state is met, the process 600 continues to progress to 610. At 608, if the condition that the current bit is not set or for changing the allocation state is not met, the process 600 continues to progress to 614. At 610, if the allocation state is not tracked, the process 600 continues to progress to 612. At 612, set a current SGL length and move to a next SGL, set tracking of the allocation state to be false, and continue to progress to 622.

At 614, if the allocation state is not tracked, the process 600 continues to progress to 620. At 620, set a current SGL offset, set to track the allocation state, set tracking of the allocation state to be true, and then the process 600 continues to progress to 622. At 622, the process 600 selects a next data block to iteratively perform the process 600, that is, after 622, the process 600 returns to 604.

At 614, if the allocation state is tracked, the process 600 continues to progress to 616. At 616, if the following condition is met: a compression group alignment function is enabled, 64K alignment is performed, and if a data block here is in the compression group, not at the end of the compression group, the process 600 continues to progress to 618. If the condition is not met, the process 600 continues to progress to 622.

At 618, find the end of the last compression group, set a current SGL length to the end of the last compression group, move a next data block to the beginning of a current compression group, and then move to a next SGL. At 620, set a current SGL offset, set to track the allocation state, and set tracking of the allocation state to be true. Then, the process 600 progresses to 622.

It can be seen that in the process 600, there is no additional data to be transmitted, but some additional memories are needed for bitmap expansion. For example, to obtain a 4 KB bitmap, a 16 KB memory size needs to be allocated (where 4 KB for a snapshot difference bit, 4 KB for compression group information, and 8 KB for previously allocation state bits), but this can avoid partial reading compression group overheads. As a replication source with a page size of 4K, IO alignment in the compression group mainly occurs in variable compression lengths.

The embodiment in FIG. 3 is implemented, so that alignment of IO ranges in the compression group expands an original allocation state bitmap, avoiding partial reading of the compression group and avoiding a decompression-recompression cycle. IOs can be optimized and integrated into a state bitmap and applied to the process of generating the SGL without introducing the decompression-recompression cycle. Scanning the state bitmap only once can generate the SGL for IO replication.

Figure 7:
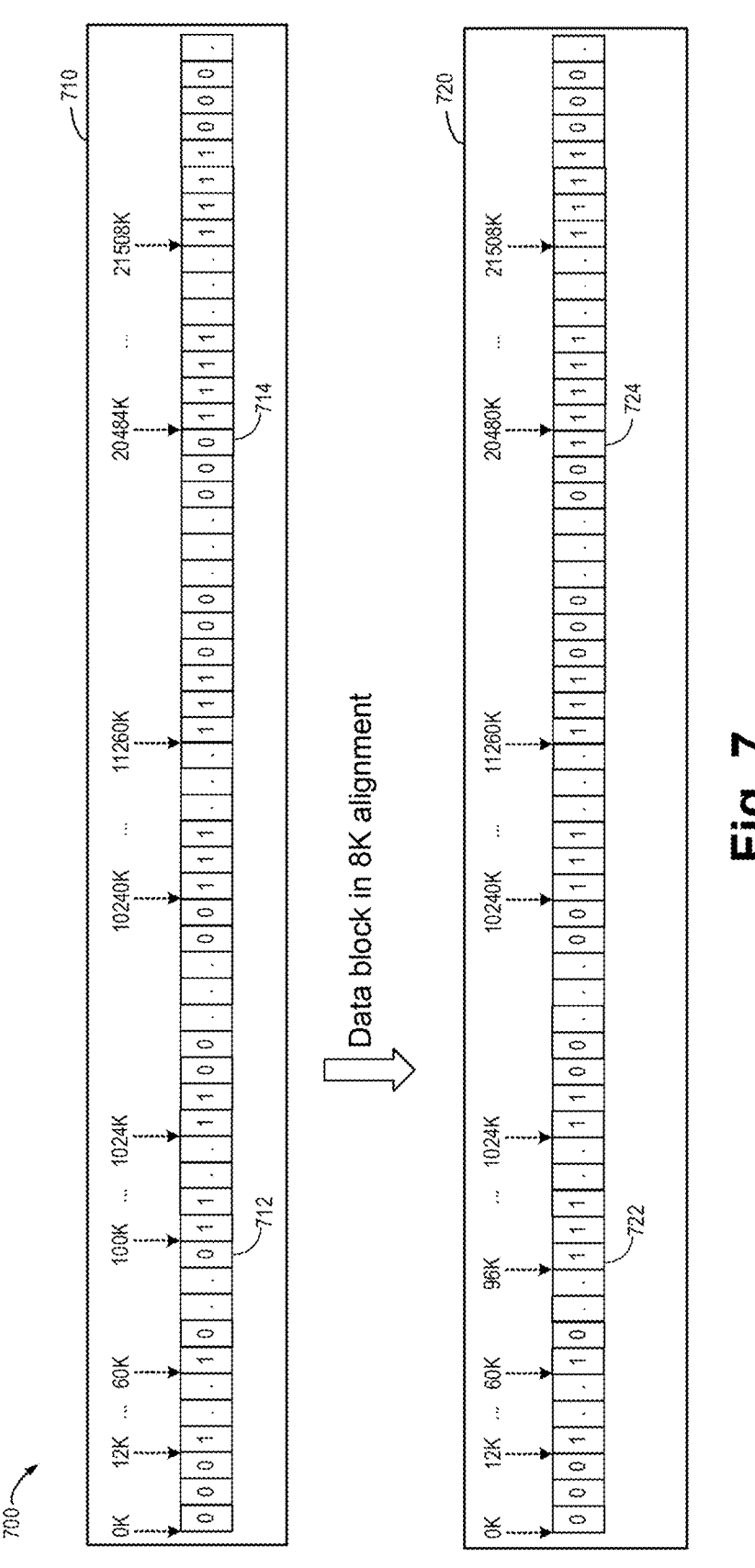
FIG. 7 schematically shows a schematic diagram of a process of alignment based on a page size according to an example implementation the present disclosure.

FIG. 7 schematically shows a schematic diagram of a process 700 of alignment based on a page size according to an example implementation the present disclosure. In a scenario shown in FIG. 7, the page size is 8 KB instead of the conventional 4 KB. Therefore, each IO will have a granularity of 8 KB in terms of data writing/reading, locking, and snapshot differences. IO writing of some data on the page (not 8 KB alignment) also needs to lock an entire 8 KB page. In this way, if a source node is a 4 KB page and a target node is an 8 KB page, 8 KB alignment needs to be performed. Because in a system with a page size of 4 KB, a snapshot difference is also at a 4 KB granularity, with a maximum replication IO size of 64 KB. If an increment starts from an offset of 4 KB and a length of 1 MB, the increment will be divided into 1 MB/64 KB=16 IO requests, and an offset of each IO request is not of 8 KB alignment. After the increment is replicated to the target node with a page size of 8 KB, each IO request shares an 8 KB page with a previous IO request and needs to wait for the previous request to complete, so IO latency gradually increases.

In the embodiment of FIG. 7, during a replication setup process, a capability of the source node and a capability of the remote node are matched to determine which IO alignment is required, and a corresponding IO alignment parameter is then transferred to a backend data replicator object. Only when a page size of the source node is 4 KB and a remote page size is 8 KB, does an IO offset need to be aligned to 8 KB. Otherwise, the IO offset does not need to be aligned to 8 KB. This is because an offset in 8 KB is always of 4 KB alignment. Specifically, Table 2 shows types of IO alignment.

TABLE 2

| IO alignment type | | |
|---|---|---|
| Source node IO capability | Remote node IO capability | IO alignment type |
| PAGESIZE_IN_4 KB | PAGESIZE_IN_8 KB | 8 KB alignment |
| PAGESIZE_IN_4 KB | PAGESIZE_IN_4 KB | No need |
| PAGESIZE_IN_8 KB | PAGESIZE_IN_4 KB or PAGESIZE_IN_8 KB | No need |
| COMPRESS_IN_4 KB | COMPRESS_IN_4 KB or COMPRESS_IN_VARIABLE | No need |
| COMPRESS_IN_VARIABLE | COMPRESS_IN_4 KB or COMPRESS_IN_VARIABLE | Alignment to a compression group |

If a data block is of a page size of 4 KB, the data block has a capability referred to as PAGESIZE_IN_4 KB. For a data block of a page size of 8 KB, the data block has PAGESIZE_IN_8 KB. If a data block is compressed at fixed 4 KB, the data block has COMPRESS_IN_4 KB. If a data block is compressed at a variable length, the data block has COMPRESS_IN_VARIABLE.

As shown in FIG. 7, a snapshot difference bitmap of data is shown in block 710. In the figure, 1 indicates that a corresponding page has changed. A logical address of the page increases from the leftmost 0K (KB), with each page occupying 4K. It can be seen that values at 712 (namely, location 96K) and 714 (namely, location 20480) are 0, so the data here does not need to be transmitted. If 8K alignment has been performed, then as shown in block 720, a result of performing 8K alignment is shown. At 722 in block 720 (namely, 712 in block 710), the value becomes 1. Similarly, at 724 in block 720 (namely, 714 in block 710), the value becomes 1. In this way, data from both locations needs to be transmitted.

More comprehensively, the following data blocks change: 12K to 60K, 100K to 1024K, 10240K to 11260K, and 20484K to 21508K. The first data block is smaller than 64K, so alignment is not required. An offset of the second data block meets an 8 KB alignment condition, so the offset of the second data block will be updated to 96K. The third data block has already performed 8K alignment. An offset of the fourth data block will be aligned with 20480K.

Then, a data replicator object will retrieve a snapshot difference, and check each bit in a set in a snapshot difference bitmap, to perform IO alignment based on a parameter value. If IO offset 8 KB alignment is set, an offset of a changed data block is aligned to 8 KB if a length of a changed data block is greater than 64 KB. This is because the changed data block within 64 KB will be in a single replication IO and will not share any pages with other IOs.

Here are some formulas for implementing 8 KB alignment:

$$offset = (offset/8 \text{ KB}) * 8 \text{ KB} \tag{1}$$

$$offset = (offset >> 13) << 13 \tag{2}$$

$$offset = offset \text{ \& } 0xFFFFFFFFFFFFE000 \text{ (an offset in 64 bits)} \tag{3}$$

where offset indicates an offset. Formula (1) indicates calculating the offset mathematically. Formula (2) and Formula (3) indicate determining the offset in a manner of logical operations. Formula (2) indicates a bit operation, where >>13 indicates moving 13 bits to the right, and <<13 indicates moving 13 bits to the left. 0xFFFFFFFFFFFFE000 in Formula (3) indicates a logical address, and the last three 000s indicate truncating excess parts (misaligned parts).

Figure 8:
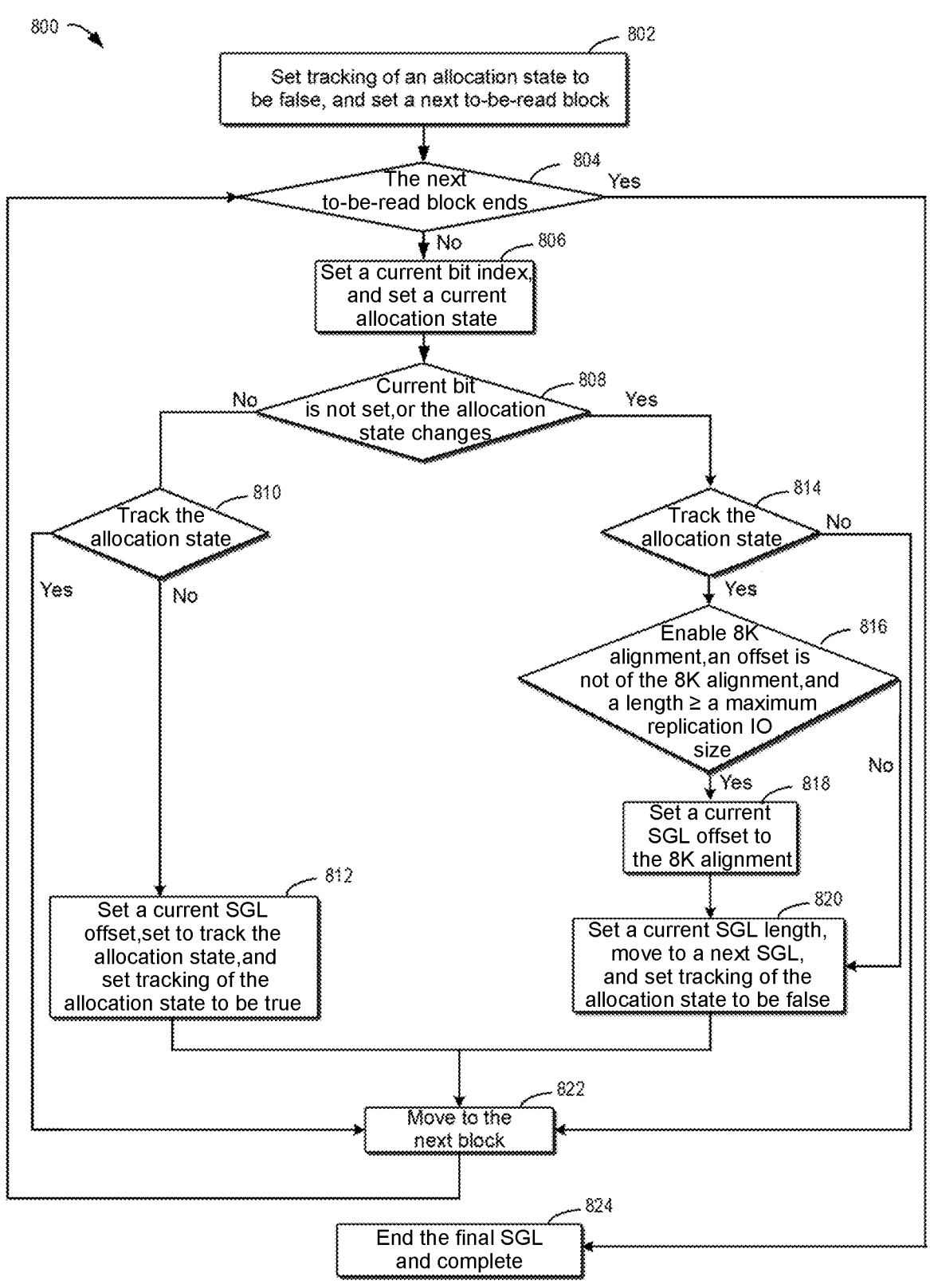
FIG. 8 schematically shows a schematic diagram of a process of generating an SGL of alignment based on a page size according to an example implementation of the present disclosure.

In order to have a more complete understanding of how to generate the SGL, the present disclosure proposes a process of generating an SGL of alignment based on a page size, as shown in FIG. 8. FIG. 8 schematically shows a schematic diagram of a process 800 of generating an SGL of alignment based on a page size according to an example implementation of the present disclosure. Service logic for replicating IOs to generate an SGL is shown in FIG. 8, and the discussion is based on a page size of a source node being 4 KB and a page size of a target node being 8 KB.

In FIG. 8, how to generate a replicated data block in an SGL from a bitmap is described. Continuous bits in a set with the same allocation state will be in one SGL. If a bit is not set or an allocation state changes, a current SGL will be completed and a next bit in a next SGL will be started. If 8K alignment is enabled, a data transmission length increases by one page size, which is almost negligible, but a significant decrease in IO performance can be avoided.

At 802, prepare to generate the SGL, set (for example, determine) tracking of an allocation state to be false at this point, and set a to-be-read next data block. At 804, determine whether the to-be-read next data block ends. If the to-be-read next data block does not end, the process 800 continues to progress to 806. If the to-be-read next data block ends, the process 800 continues to progress to 824. At 824, end a final SGL and complete the entire SGL generation process.

After the to-be-read next data block is read, at 806, set a current bit index, and set a current allocation state. At 808, if a current bit is not set or the allocation state changes, the process 800 continues to progress to 814. At 808, if a current bit is not set or a condition for changing the allocation state is not met, the process 800 continues to progress to 810. At 810, if the allocation state is not tracked, the process 800 continues to progress to 812. At 812, set a current SGL offset, set to track the allocation state, set tracking of the allocation state to be true, and continue to progress to 822.

At 810, if the allocation state is tracked, the process 800 continues to progress to 822. At 822, move to a next data block. At 814, if the allocation state is tracked, the process 800 continues to progress to 816. At 816, if the following condition is met: if 8K alignment is enabled and if an offset is not of the 8K alignment and a length of the data block is greater than or equal to a maximum replication IO, the process 800 continues to progress to 818. If the condition is not met, the process 800 continues to progress to 820.

At 818, set the current SGL offset to the 8K alignment, and the process 800 continues to progress to 820. At 820, set a current SGL length, move to a next SGL, and set tracking of the allocation state to be false. Then, the process 800 progresses to 822. At 822, the process 800 selects a next data block to iteratively perform the process 800, that is, after 822, the process 800 returns to 804.

In this way, embodiments of the present disclosure are implemented, so that a universal framework is defined to optimize an IO based on a system function, and it is easy to expand to new functions in the future, for example, further increasing a maximum IO length or page size. In this way, two IO alignment methods can be implemented to avoid IO performance degradation caused by inconsistent IO capabilities between a target storage device and a source storage device, reduce data transmission overheads, and improve data transmission performance. In some embodiments, a method is proposed to check each parameter value on two storage sites, and then automatically adjust an IO range (an offset or a length) to be consistent with an implementation on a target storage array to avoid performance degradation during a replication process.

Figure 9:
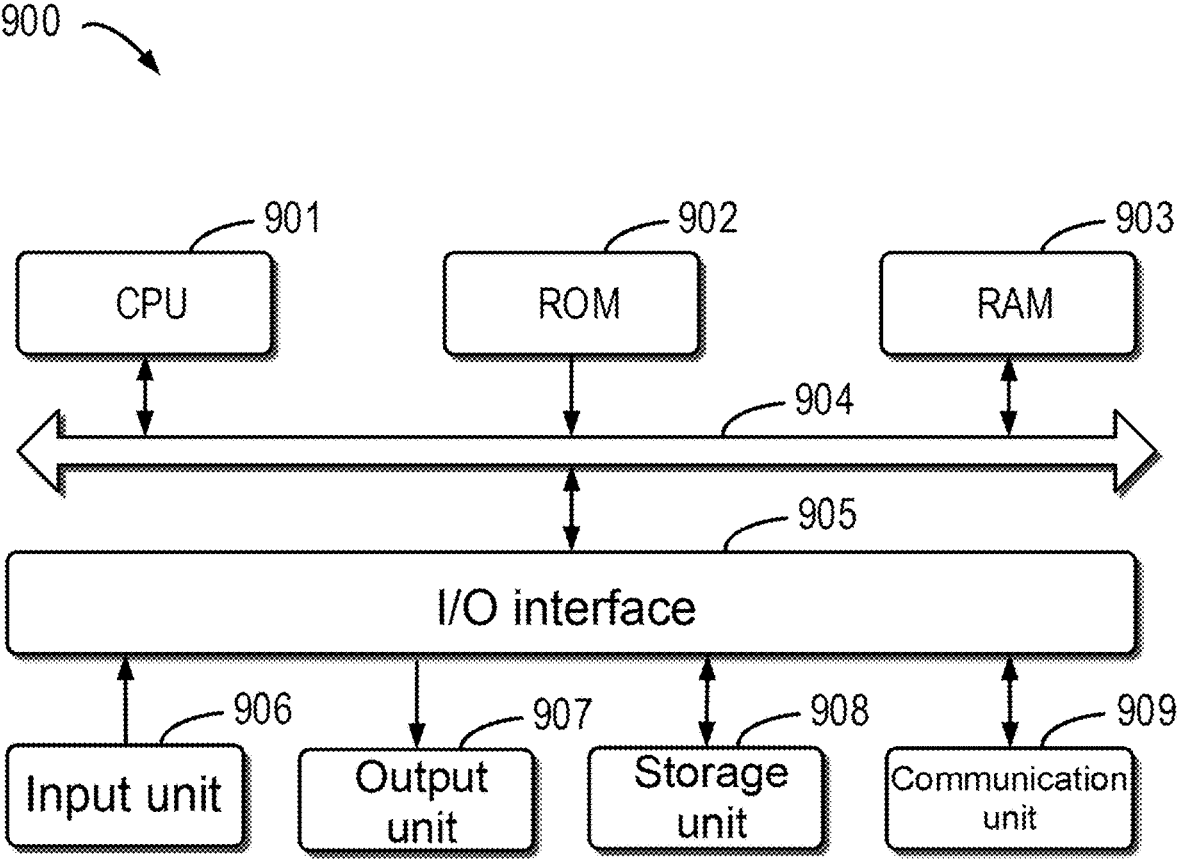
FIG. 9 schematically shows a block diagram of a device for replicating data according to an example implementation of the present disclosure.

FIG. 9 shows a schematic block diagram of a device 900 that may be configured to implement embodiments of the present disclosure. The device 900 may be the device or the apparatus described in embodiments of the present disclosure. As shown in FIG. 9, the device 900 includes a central processing unit (CPU) 901 that may perform various appropriate actions and processing according to computer program instructions stored in a read-only memory (ROM) 902 or computer program instructions loaded from a storage unit 908 into a random access memory (RAM) 903. In the RAM 903, various programs and data required for the operation of the device 900 may also be stored. The CPU 901, the ROM 902, and the RAM 903 are connected to each other through a bus 904. An input/output (I/O) interface 905 is also connected to the bus 904. Although not shown in FIG. 9, the device 900 may further include a co-processor.

A plurality of components in the device 900 are connected to the I/O interface 905, including: an input unit 906, such as a keyboard and a mouse; an output unit 907, such as various types of displays and speakers; the storage unit 908, such as a magnetic disk and an optical disc; and a communication unit 909, such as a network card, a modem, and a wireless communication transceiver. The communication unit 909 allows the device 900 to exchange information/data with other devices via a computer network, such as the Internet, and/or various telecommunication networks.

The various methods or processes described above may be performed by the CPU 901. For example, in some embodiments, the method may be implemented as a computer software program that is tangibly included in a machine-readable medium, such as the storage unit 908. In some embodiments, some or all of the computer program may be loaded and/or installed onto the device 900 via the ROM 902 and/or the communication unit 909. When the computer program is loaded onto the RAM 903 and executed by the CPU 901, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions, so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions can also be loaded onto a computer, another programmable data processing apparatus, or another device, so that a series of operating steps are performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of the instruction including one or more executable instructions for implementing specified logical functions. In some alternative implementations, the functions denoted in the blocks may also occur in an order different from that denoted in the drawings. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of a dedicated hardware and computer instructions.

The embodiments of the present disclosure have been described above. The above descriptions are illustrative, rather than exhaustive, and are not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed herein.

The invention claimed is:

1. A method for replicating data, comprising:
obtaining, based on a state bitmap of the data, a first identifier indicating a snapshot difference of the data and a second identifier indicating an allocation state of the data, wherein the first identifier indicates that data in which pages in the data needs to be replicated from a source node to a target node, and the second identifier indicates which pages in the data are compressed together as a single compression group;
generating scatter-gather information for replicating the data based on an input output IO capability of the target node, the first identifier, and the second identifier; and
replicating the data corresponding to the scatter-gather information from the source node to the target node;
wherein the highest bit of the state bitmap indicates the first identifier, the first identifier indicates whether data for a single page in the data is changed, three adjacent bits to the highest bit indicate the second identifier, and the second identifier indicates one of the following: the single page is a start page, an end page, or a middle page of the single compression group, or a page that is not within the single compression group.

2. The method according to claim 1, wherein obtaining, based on a state bitmap of the data, a first identifier indicating a snapshot difference of the data and a second identifier indicating an allocation state of the data comprises:
scanning a leaf node of each page in the data to determine a first identifier group;
obtaining a second identifier group that relates to a plurality of compression groups in the data and stored in a virtual logical block VLB of the source node;
combining the first identifier group and the second identifier group to generate the state bitmap; and
reading the state bitmap from the VLB.

3. The method according to claim 1, wherein the scatter-gather information is a scatter-gather list SGL, and wherein generating scatter-gather information for replicating the data based on an input output IO capability of the target node, the first identifier, and the second identifier comprises:
determining, based on the IO capability of the target node, a maximum IO length that the target node is capable of supporting;
determining a position of the single compression group in the data; and
generating the SGL based on the position of the single compression group in the data and the maximum IO length, so that the single compression group is not interrupted when being replicated.

4. The method according to claim 3, wherein generating the SGL based on the position of the single compression group in the data and the maximum IO length, so that the single compression group is not interrupted when being replicated comprises:
determining, in response to a length of the single compression group being greater than the maximum IO length, a position of a breakpoint when the single compression group is replicated; and
terminating the SGL before the single compression group; and
wherein the method further comprises:
determining another SGL starting from a start page of the single compression group.

5. The method according to claim 4, wherein determining a position of a breakpoint when the single compression group is replicated comprises:

checking if the start page of the single compression group is aligned with the maximum IO length, wherein the alignment indicates that a position of the start page of the SGL is an integer multiple of the maximum IO length.

6. The method according to claim 1, wherein the method further comprises:

matching an IO capability of the source node with the IO capability of the target node; and generating a scatter-gather list SGL based on a result of the matching.

7. The method according to claim 6, wherein matching an IO capability of the source node with the IO capability of the target node comprises:

in response to determining that a second size of a page of the target node is an integer multiple of a first size of a page of the source node, determining an IO offset used for replicating the data to be equal to the second size.

8. The method according to claim 7, further comprising:

determining, based on the first identifier, a plurality of data blocks that need to be replicated, wherein each data block comprises continuous data; and for a single data block, in response to a length of the single data block being greater than the maximum IO length supported by the target node, aligning an offset of the single data block to the second size.

9. The method according to claim 8, wherein aligning an offset of the single data block to the second size comprises:

determining the offset based on a logical shift between a position of the single data block in the data and the second size; and adjusting a position of a start page of the SGL to an integer multiple of the second size based on the offset.

10. An electronic device, comprising:

a processor; and a memory coupled to the processor, wherein the memory has instructions stored therein, and the instructions, when executed by the processor, cause the device to perform actions comprising:

obtaining, based on a state bitmap of data, a first identifier indicating a snapshot difference of the data and a second identifier indicating an allocation state of the data, wherein the first identifier indicates that data in which pages in the data needs to be replicated from a source node to a target node, and the second identifier indicates which pages in the data are compressed together as a single compression group;

generating scatter-gather information for replicating the data based on an input output IO capability of the target node, the first identifier, and the second identifier; and replicating the data corresponding to the scatter-gather information from the source node to the target node;

wherein obtaining, based on a state bitmap of the data, a first identifier indicating a snapshot difference of the data and a second identifier indicating an allocation state of the data comprises:

scanning a leaf node of each page in the data to determine a first identifier group;

obtaining a second identifier group that relates to a plurality of compression groups in the data and stored in a virtual logical block VLB of the source node;

combining the first identifier group and the second identifier group to generate the state bitmap; and reading the state bitmap from the VLB.

11. The electronic device according to claim 10, wherein the highest bit of the state bitmap indicates the first identifier, the first identifier indicates whether data for a single page in the data is changed, three adjacent bits to the highest bit indicate the second identifier, and the second identifier indicates one of the following: the single page is a start page, an end page, or a middle page of the single compression group, or a page that is not within the single compression group.

12. The electronic device according to claim 10, wherein the scatter-gather information is a scatter-gather list SGL, and wherein generating scatter-gather information for replicating the data based on an input output IO capability of the target node, the first identifier, and the second identifier comprises:

determining, based on the IO capability of the target node, a maximum IO length that the target node is capable of supporting;

determining a position of the single compression group in the data; and generating the SGL based on the position of the single compression group in the data and the maximum IO length, so that the single compression group is not interrupted when being replicated.

13. The electronic device according to claim 12, wherein generating the SGL based on the position of the single compression group in the data and the maximum IO length, so that the single compression group is not interrupted when being replicated comprises:

determining, in response to a length of the single compression group being greater than the maximum IO length, a position of a breakpoint when the single compression group is replicated; and terminating the SGL before the single compression group; and wherein the actions further comprise:

determining another SGL starting from a start page of the single compression group.

14. The electronic device according to claim 13, wherein determining a position of a breakpoint when the single compression group is replicated comprises:

checking if the start page of the single compression group is aligned with the maximum IO length, wherein the alignment indicates that a position of the start page of the SGL is an integer multiple of the maximum IO length.

15. The electronic device according to claim 10, wherein the actions further comprise:

matching an IO capability of the source node with the IO capability of the target node; and generating a scatter-gather list SGL based on a result of the matching.

16. The electronic device according to claim 15, wherein matching an IO capability of the source node with the IO capability of the target node comprises:

in response to determining that a second size of a page of the target node is an integer multiple of a first size of a page of the source node, determining an IO offset used for replicating the data to be equal to the second size.

17. The electronic device according to claim 16, wherein the actions further comprise:

determining, based on the first identifier, a plurality of data blocks that need to be replicated, wherein each data block comprises continuous data; and for a single data block, in response to a length of the single data block being greater than the maximum IO length supported by the target node, aligning an offset of the single data block to the second size, wherein aligning an offset of the single data block to the second size comprises:

determining the offset based on a logical shift between a position of the single data block in the data and the second size; and adjusting a position of a start page of the SGL to an integer multiple of the second size based on the offset.

18. A computer program product having a non-transitory computer readable medium which stores a set of instructions to replicate data; the set of instructions, when carried out by computerized circuitry, causing the computerized circuitry to perform a method of:

obtaining, based on a state bitmap of the data, a first identifier indicating a snapshot difference of the data and a second identifier indicating an allocation state of the data, wherein the first identifier indicates that data in which pages in the data needs to be replicated from a source node to a target node, and the second identifier indicates which pages in the data are compressed together as a single compression group;

generating scatter-gather information for replicating the data based on an input output IO capability of the target node, the first identifier, and the second identifier; and replicating the data corresponding to the scatter-gather information from the source node to the target node;

wherein the scatter-gather information is a scatter-gather list SGL, and wherein generating scatter-gather information for replicating the data based on an input output IO capability of the target node, the first identifier, and the second identifier comprises:

determining, based on the IO capability of the target node, a maximum IO length that the target node is capable of supporting;

determining a position of the single compression group in the data; and generating the SGL based on the position of the single compression group in the data and the maximum IO length, so that the single compression group is not interrupted when being replicated.

19. The computer program product according to claim 18, wherein generating the SGL based on the position of the single compression group in the data and the maximum IO length, so that the single compression group is not interrupted when being replicated comprises:

determining, in response to a length of the single compression group being greater than the maximum IO length, a position of a breakpoint when the single compression group is replicated; and terminating the SGL before the single compression group; and wherein the method further comprises:

determining another SGL starting from a start page of the single compression group.

20. The computer program product according to claim 19, wherein determining a position of a breakpoint when the single compression group is replicated comprises:

checking if the start page of the single compression group is aligned with the maximum IO length, wherein the alignment indicates that a position of the start page of the SGL is an integer multiple of the maximum IO length.

* * * * *